Oct. 16, 1951     L. S. WILLIAMS     2,571,400
PIVOT AND BEARING
Filed March 29, 1946     2 Sheets-Sheet 1
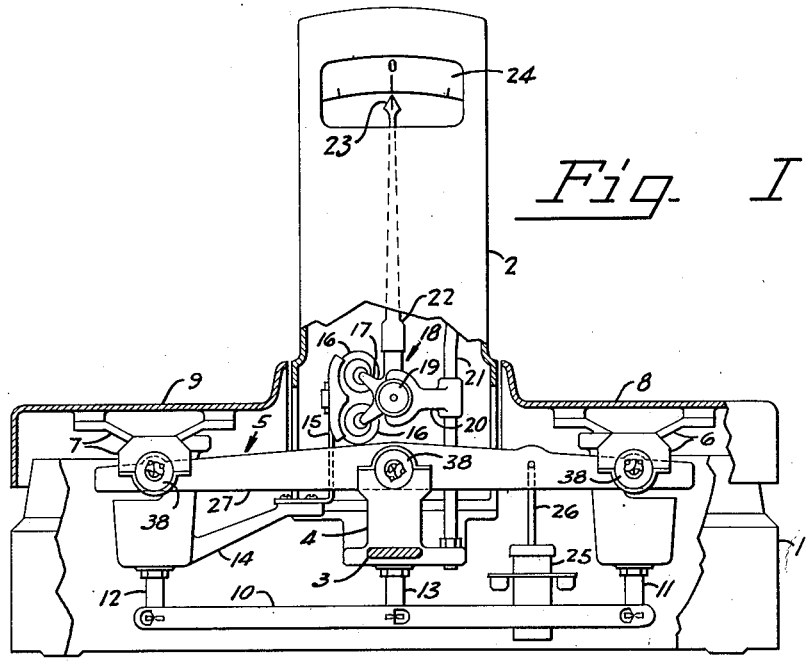
*Fig. I*
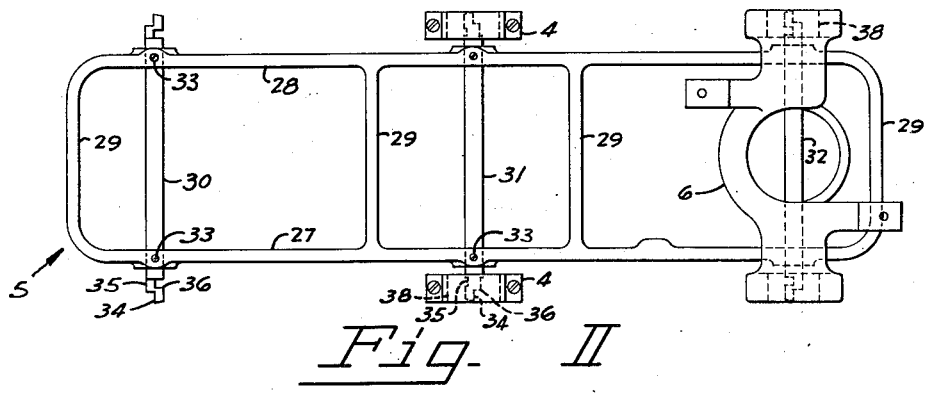
*Fig. II*
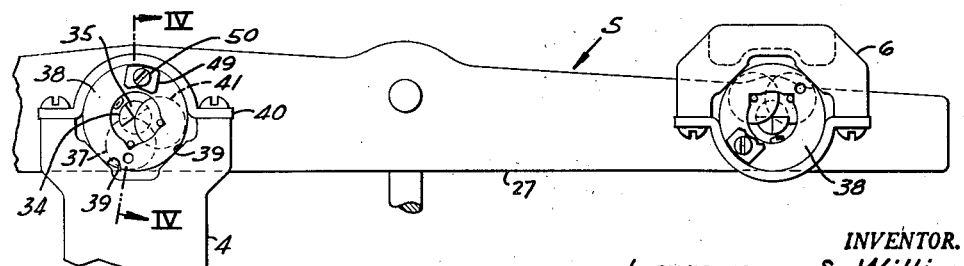
*Fig. III*
INVENTOR.
Lawrence S. Williams
BY
Marshall and Marshall
ATTORNEYS Oct. 16, 1951     L. S. WILLIAMS     2,571,400
PIVOT AND BEARING
Filed March 29, 1946     2 Sheets-Sheet 2
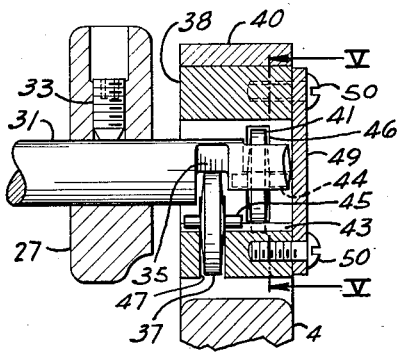
Fig. IV
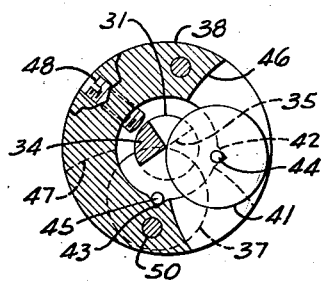
Fig. V
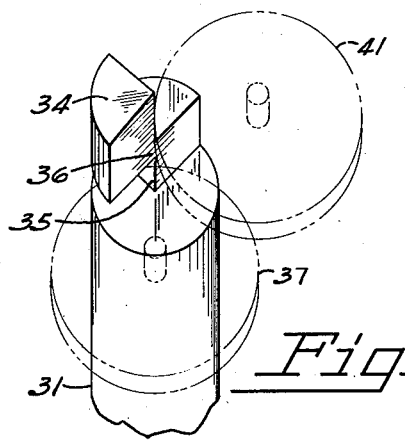
Fig. VI
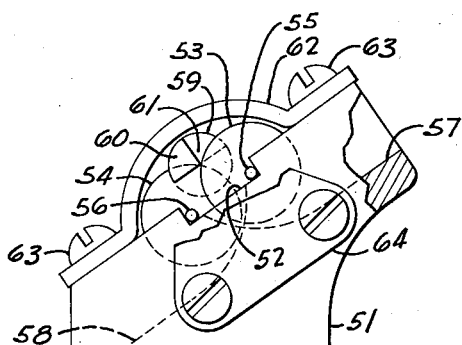
Fig. VII
INVENTOR.
Lawrence S. Williams
BY
Marshall and Marshall
ATTORNEYS Patented Oct. 16, 1951

2,571,400

UNITED STATES PATENT OFFICE 2,571,400

PIVOT AND BEARING

Lawrence S. Williams, Toledo, Ohio, assignor to Toledo Scale Company, Toledo, Ohio, a corporation of New Jersey Application March 29, 1946, Serial No. 658,039

7 Claims. (Cl. 308—2)

This invention relates to pivots and bearings for use in weighing scales.

The accuracy and sensitivity of any weighing scale depends upon the quality of the pivotal connections between the levers of the scale and the pivotally connected members. The common type of pivotal connection for use in weighing scales comprises a sharp knife edge pivot resting in the valley of a V-bearing. This type of pivotal connection is subject to two errors commonly called friction and change. The first of these errors arises when the knife edge and the V-bearing each accommodates itself toward the shape of the other so that a condition similar to an axle rotating in a journal is produced. This condition is aggravated because dirt collecting on the inclined sides of the V-bearing slides to the bottom of the V where it interferes with the free rocking movement of the knife edge.

The other error, the change error, occurs when a pivot and bearing have been relatively displaced so that the pivot rests against one of the inclined sides of the V-bearing rather than against the bottom of the V. If the knife edge were infinitely sharp this displacement would not affect the accuracy of the scale. But the ordinary knife edge has an edge which is more or less cylindrical in cross section. When the knife edge is displaced relative to the bearing the point of contact between the cylindrical portion of the knife edge and the bearing is displaced to one side or the other of the lowermost element of the knife edge. This displacement alters the effective pivot distances of the lever and such alterations, by changing the multiplication of the lever, affect the indication. Inasmuch as a shift or displacement of the knife edge in the bearing does not increase the area of contact between the knife edge and bearing it does not increase the friction in the bearing or affect the sensitivity of the scale.

These errors are reduced to relatively small quantities when the V-bearings are replaced by flat bearings and a relieving gear is used to set the pivots on the bearings when a weighing is to be made.

The principal object of this invention is to provide a pivot and bearing construction which gives the effect of a knife edge resting on a flat bearing but which requires no relieving gear to keep the knife edge located on the bearing.

Another object of the invention is to provide a pivot and bearing assembly which is relatively free from the effect of dirt.

A still further object is to provide a pivot and bearing construction having a particularly great range of oscillation.

A still further object is to provide a pivot and bearing which positively locates the lever with respect to the pivotally connected members.

More specific objects and advantages are apparent from the following description in which reference is made to drawings illustrating a preferred embodiment of the invention.

The invention consists in shaping those portions of a lever pivot which cooperates with a bearing to provide aligned knife edges directed at various angles and to provide the cooperating bearing with hardened rollers journaled on parallel axes spaced from each other so that each of the aligned knife edges rests against one of the rollers. In the preferred form of the invention the aligned knife edges are directed substantially at right angles to each other and each is substantially normal to the surface of the roller against which it rests. This construction avoids the principal source of friction encountered when a knife edge is placed in a sharp V-bearing, because it consists essentially of two knife edges each of which rests against a substantially plane surface and the forces are exerted normal to those surfaces. If those surfaces are rigid and the knife edges are not precisely in line, one of the knife edges must slide on its bearing surface when the lever oscillates. The condition then is similar to a square shaft turning in a round bearing and the friction disappears only when the cross section of the equivalent square shaft reduces to zero, that is, when the knife edges are exactly aligned. By supporting the knife edges on journaled rollers instead of on rigid surfaces this friction due to misalignment of the knife edges is very materially reduced.

In the embodiment of the invention shown in the drawings each end of each pivot is carried on two rollers which are journaled either in the fulcrum stand for the lever or in the spiders for supporting the load receiving platters.

In the drawings:

Figure I is a front elevation, with parts broken away, of a weighing scale incorporating the improved pivots and bearings.

Figure II is a plan of the lever showing the general arrangement of the pivots.

Figure III is a fragmentary side elevation of the lever and including a fulcrum bearing and a spider bearing.

Figure IV is a vertical section, at an enlarged scale, taken substantially along the line IV—IV of Figure III.

Figure V is a vertical transverse section taken along the line V—V of Figure IV.

Figure VI is a perspective view of the improved pivot and its cooperation with the supporting rollers.

Figure VII is a fragmentary side elevation showing a modified form of bearing assembly.

These specific figures and the accompanying description are intended merely to illustrate the invention and not to impose limitations on the claims.

The improved pivot and bearing may be used whenever a pivotal connection having extremely low friction is required and the transmitted forces are always in the same direction. It may take the place of ordinary knife edges and V-bearings where increased precision and freedom from change errors are required. For the purposes of illustration the improved pivot and bearing is shown in a small even arm type of balance. Such a balance is illustrated in Figure I. This balance or scale comprises a base 1, generally rectangular in shape, from whose center portion a hollow indicator tower 2 is erected. A narrow transverse bridge 3 spanning the space between the sides of the base 1 has upwardly extending fulcrum stands 4 upon which a lever 5 is pivotally mounted. A pair of spiders 6 and 7 pivotally supported from the ends of the lever 5 carry load and counterweight receiving platters 8 and 9. Check links 10 pivotally connected to depending posts 11 and 12 of the spiders 6 and 7 and an intermediate fixed post 13 depending from the underside of the transverse bridge 4 hold the spider supported platters 8 and 9 in horizontal position so that the weight readings are independent of the location of the load on the platters.

An arm 14 extending toward the center of the housing from the spider 7 has a counter force spring bracket 15 attached to its end and extending upwardly into the base of the indicator tower 2. A pair of spiral counterforce springs 16 clamped in the bracket 15 have their free ends connected to arms 17 of an indicator assembly 18. The indicator assembly 18 is pivotally mounted in an antifriction bearing 19 whose supporting bracket 20 is mounted on a vertical rod 21 erected from a lateral extension of the transverse bridge 3.

The indicator assembly 18 includes an indicator arm 22 whose index tip 23 cooperates with a chart 24 supported from the upper end of the vertical rod 21.

Oscillations of the lever are controlled by a hydraulic dashpot 25 whose plunger stem 26 is pivotally connected to the lever 5.

The lever 5 has side frames 27 and 28 held in spaced relationship by cross members 29. The side frames 27 and 28 are provided with drilled bosses in which pivots 30, 31, and 32 are mounted. The pivots 30, 31, and 32 are held in place by a plurality of set screws 33 threaded down through the side frames 27 and 28 and tightened against the pivots.

The ends of the pivots 30, 31, and 32 are reduced to semi-cylindrical cross section (see also Figure VI) then alternate quadrants are cut away to leave a pair of quadrants 34 and 35 connected by a semi-cylindrical web section 36. The intersections of the flat radial sides of the quadrants 34 and 35, which lie in the axis of the pivot, form the knife edges about which the pivot turns. The fulcrum pivot 31 is oriented such that its quadrant 35, that quadrant nearest the lever, has its knife edge portion directed substantially vertically downward. The knife edge of the quadrant 35 rests against the periphery of a hardened roller 37 which is journaled in an annular bushing 38 mounted in a fulcrum stand 4. To facilitate positioning the annular bushing 38 the top of the fulcrum stand 4 is formed with a notch having inclined, machined surfaces 39 against which the bushing rests. The bushing is held in place by a semi-circular clip 40 screwed to the top of the fulcrum stand 4.

The greater part of the weight of the lever 5 is carried by the knife edge of the quadrant 35 because its line of action is substantially vertical and normal to the upper surface of the roller 37. The bushing 38 is positioned so that the roller 37 is not directly beneath the pivot 31, but is displaced to one side so that there is a definite tendency for the roller to turn and the lever to move in one direction. This tendency is restricted by a second roller 41 against which the knife edge of the quadrant 34 is directed. The combination of the two knife edges and the two rollers gives the effect of a perfectly sharp V-bearing to positively position the lever, while the freedom of the rollers to turn reduces the friction to a practically insignificant amount.

In the construction of the improved bearing a generally cylindrical member is bored out to a diameter slightly greater than the rollers 37 or 41. This gives the annular bushing 38. This bushing is then broached to provide notches 42 and 43 (Figure V) to receive axles 44 and 45 of the rollers 41 and 37 respectively. A narrow milling cutter is then run into the side of a bushing to partially intersect the bored hole and thus provide slots 46 and 47 in which the rollers operate. The pivot is prevented from getting out of operative relationship with the bearing by a stop screw 48 threaded radially through the annular bushing 38. The bearing is assembled by sliding the rollers through the bore until they drop into their respective slots with their axles engaged in the notches 42 and 43. After the pivot has been inserted the stop screw 48 is adjusted and the bearing is clamped in place.

The end of the pivots are beveled to leave points in line with the knife edges which may thrust against thrust plates 49 secured to the annular bushings 38 by screws 50.

The bearings for supporting the spiders from the knife edges are constructed in the same manner as the fulcrum bearings described.

It will be noticed from Figure III that the pivot and its cooperating bearing may be rotated so that the load is divided equally between the rollers. Thus the spider bearing in Figure III shows the rollers at the same height and the pivot knife edges oriented so that the lines of pressure are normal to the rollers and inclined 45 degrees from the vertical. While the minimum of friction is obtained if most of the load is concentrated on that knife edge nearer the lever by setting the nearer roll almost directly beneath the pivot, this arrangement gives the least amount of force tending to hold the lever in position. If the pivot and bearing are rotated toward the 45 degree position the friction increases slightly, but the force available for holding the lever or the spider bearings on the pivots against the upsetting forces of eccentric loading on the spiders increases much more rapidly. In the 45 degree position a lateral force equal to about $\frac{1}{16}$ of the applied load is available for resisting lateral movement, but the sum of the forces transmitted through the knife edges to the rollers is approximately 40 per cent greater than the applied load.

A modified construction for the bearing assembly is illustrated in Figure VII in which the modifications are designed to facilitate its manufacture. In the modified form the upper ends of fulcrum stands 51 are machined flat, the surfaces being horizontal or inclined at an angle approaching but not exceeding 45 degrees inclination from the horizontal. Both fulcrum stands are similarly treated and are machined so that their finished surfaces are coplanar. A shallow rectangular notch 52 following a generally horizontal line is cut across the finished surfaces of the fulcrum stands. The cut surfaces of the notch may be hardened and ground so as to be exactly parallel to each other. A pair of hardened rollers 53 and 54 having integrally formed axles 55 and 56 are positioned in cross grooves 57 and 58 milled in the upper end of the fulcrum stand 51 with the axles of the rollers resting in the corners of the notch 52.

The size of the rollers 53 and 54 and the width of the notch 52 are related so that, in end elevation, the peripheries of the rollers intersect at substantially right angles and the tangent to the periphery of the roll 54 at the point of intersection inclines toward the roll 53. A pivot 59 having knife-edged quadrants 60 and 61 rests on the rollers 53 and 54 with the knife edges positioned substantially normal to the surfaces of the rolls at the points of contact.

A formed clip 62 secured to the finished surface of the fulcrum stand 51 by a pair of screws 63 prevents the pivot from being dislodged from its position at the intersection of the roll peripheries. The pivot is held against endwise motion by a triangularly shaped thrust plate 64 which lightly bears against a beveled tip of the pivot.

Small clips or spacers may be employed in the notch 52 to hold the rollers near their correct position in the event that the pivot is displaced from its true position. These spacers must not pinch or bind the axles 55 and 56 or the advantages of the improved bearing will be lost.

The spiders 6 and 7 of the weighing scale illustrated in Figure I may also be machined and notched in the same manner as the fulcrum stands shown in Figure VII. It is desirable, because of the end thrusts produced by eccentric loading, that the surfaces be finished horizontally and that the load be divided equally between the rollers. The construction then corresponds in function to the spider bearing construction shown in Figures I and III.

The modified bearing assembly is much easier to manufacture and to service than the first type illustrated and provides a weighing scale in which friction and change errors are substantially less than in the ordinary type of construction.

Various other modifications in the structure may be made to adapt the improved pivot and bearing for particular uses without departing from the spirit and scope of the invention.

Having described the invention, I claim:

1. In a device for pivotally connecting two members, in combination, a support, a pair of rollers journaled on parallel axes in the support, the rollers being offset from each other and spaced in overlapping relationship, and a pivoting member an end of which is formed with aligned knife edges spaced along the member, said knife edges being oriented such that they may simultaneously rest against the peripheries of the rollers.

2. In a device for pivotally connecting two members, in combination, a support that has a laterally extending generally rectangular notch intersected by deeper transverse notches, a pair of rollers having axles journaled in the corners of the laterally extending notch and having their peripheries in overlapping relationship, and a pivoting member that has an axle-like member having axially aligned, variously oriented knife edges bearing against the peripheries of the rollers.

3. In a device for pivotally connecting two members, in combination, a support attached to one member, the support having an inclined face that has a laterally extending generally rectangular notch and deeper notches intersecting the rectangular notch, the bottom and sides of the rectangular notch being generally parallel and perpendicular to the inclined face, a pair of rollers having axles journaled in the corners of the rectangular notch and having their peripheries in overlapping relationship, and a pivoting member that has an axle-like member having axially aligned, variously oriented knife edges bearing against the peripheries of the rollers.

4. In a device of the class described, in combination, a pair of rollers positioned on spaced axes with their peripheries in overlapping relationship, and a pivoting member having aligned, variously oriented knife edges resting against the rollers with each knife edge directed toward the axis of the supporting roller.

5. In a device of the class described, in combination, a pair of rollers positioned on spaced parallel axes with their peripheries in overlapping relationship, and a pivoting member having aligned, variously oriented knife edges resting against the rollers with the knife edges parallel to and directed toward the roller axes and with a knife edge opposed to each roller.

6. In a device of the class described, in combination, a pair of rollers positioned with their axes parallel and their peripheries overlapping, and a pivoting member having aligned, variously oriented knife edges resting against the peripheries of rollers with the knife edges extending parallel to the roller axes, the rollers and knife edes being oriented with respect to force to be transmitted to provide generally equal distribution of force between the knife edges.

7. In a device of the class described, in combination, a pair of rollers positioned with their axes parallel and their peripheries overlapping, and a pivoting member having aligned, variously oriented knife edges resting against the peripheries of rollers with the knife edges extending parallel to the roller axes, the rollers and knife edges being oriented with respect to force to be transmitted to concentrate most of the force on one roller with a small remaining component of force holding the pivoting member against the other roller.

LAWRENCE S. WILLIAMS.

REFERENCES CITED

The following references are of record in the file of this patent:

UNITED STATES PATENTS

| Number | Name | Date |
| --- | --- | --- |
| 1,012,641 | Hopkinson | Dec. 26, 1911 |
| 1,109,838 | Hedman | Sept. 8, 1914 |
| 1,583,251 | Hem | May 4, 1926 |